United States Patent
Businaro et al.

(10) Patent No.: US 7,013,915 B2
(45) Date of Patent: Mar. 21, 2006

(54) FLUID DELIVERY DEVICE

(75) Inventors: Laurent Businaro, Saint Girod (FR); Patrice Gory, Theys (FR)

(73) Assignee: ABB Process Industrie, Aix les Bains (FR)

( * ) Notice: Subject to any disclaimer, the term of this patent is extended or adjusted under 35 U.S.C. 154(b) by 4 days.

(21) Appl. No.: 11/011,854

(22) Filed: Dec. 14, 2004

(65) Prior Publication Data

US 2005/0139270 A1 Jun. 30, 2005

(30) Foreign Application Priority Data

Dec. 24, 2003 (FR) .................................. 03 51196

(51) Int. Cl.
*E03B 5/00* (2006.01)

(52) U.S. Cl. .......................... 137/580; 901/22; 901/28; 901/29

(58) Field of Classification Search ................ 137/580; 901/22, 27–29

See application file for complete search history.

(56) References Cited

U.S. PATENT DOCUMENTS 4,096,766 A * 6/1978 Pardo et al. .................. 74/640
4,683,912 A * 8/1987 Dubrosky .................... 137/580
4,899,637 A * 2/1990 Caruso ......................... 91/173
6,085,782 A * 7/2000 Ott .............................. 137/580

FOREIGN PATENT DOCUMENTS

FR 2833048 6/2003
JP 07096490 4/1995

* cited by examiner

*Primary Examiner*—A. Michael Chambers
(74) *Attorney, Agent, or Firm*—Heslin Rothenberg Farley & Mesiti P.C.

(57) ABSTRACT

Fluid delivery device, allowing a mechanical robot arm to be supplied with fluids from at least two sources of fluids, includes
 a fixed portion or stator, having connections to the sources of fluids, and
 a rotating portion or rotor, capable of moving with the robot arm, and comprising a plurality of connections for a link with the said robot arm.

A first series of channels run through a central portion of the rotor sealing at a passage between the rotor and the stator is provided by seals.

A second series of channels run through a peripheral portion of the rotor. Continuity between portions of these channels situated respectively on the rotor and the stator is provided in a zone without contact, with a reduced mechanical clearance.

5 Claims, 2 Drawing Sheets

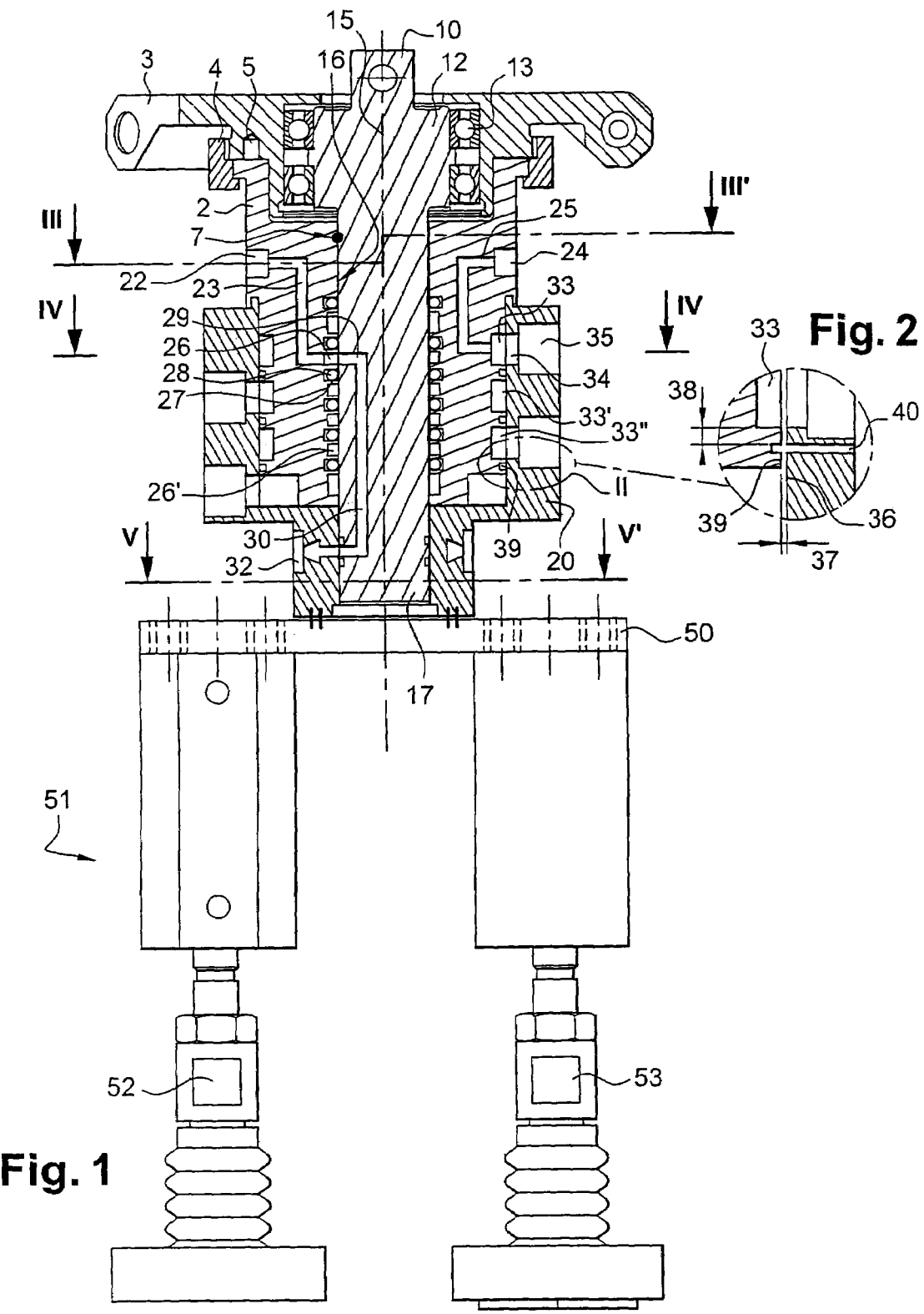

FLUID DELIVERY DEVICE

TECHNICAL FIELD

The invention relates to the field of robotized industrial installations using hydraulic or pneumatic energy.

It is aimed more particularly at a fluid delivery device allowing a mechanical robot to be supplied with fluids. It concerns more specifically arrangements of these delivery devices intended to improve the kinematics, the reliability and the maintenance of the installation.

PRIOR ART

Robotized installations usually comprise an articulated tool whose segments can be moved relative to one another by means of actuators, and in particular hydraulic or pneumatic cylinders.

The supply of these various cylinders requires that the motor fluids be conveyed from a source of fluid that is fixed to the cylinders that are therefore mobile. This conveyance is usually done with the aid of flexible hoses which are at one end fixed to an extremity of the arm of the robot tool and at the other end connected to the sources of fluids. It can be seen that this type of link poses a problem when the arm of the tool is required to rotate on itself, since the length of the flexible hoses restricts the possible rotation.

Solutions have been proposed to make the supply of fluids possible irrespective of the rotary movement of the tool. To do this, the robot is associated with a delivery device which comprises a fixed portion or stator, connected to the sources of fluids, with a mobile portion, connected to the robot, also called a rotor, which comprises connections with the portions of the robot consuming fluids. Channels running through the rotor and the stator are arranged to allow the connections of the rotor and the stator to be placed in communication, during the rotary movement of the robot. Due to the relative movement between the rotor and the stator, it is necessary to maintain sealing between these various channels, by means of rotary seals. These rotary seals, frequently O-rings, provide a contact between the rotor and the stator in their facing zones. The multiplicity of the channels frequently generates a problem of cumbersomeness.

In addition, due to the relatively high pressures that need to be conveyed in the robot, the sealing requirements are usually strict. The seals installed thus have an area of contact with the rotor and the stator that is large and therefore generates a consequent high level of friction. This friction, which increases with the number of channels, generates a resistive torque that limits the velocity of the rotary movement of the robot. One problem which the invention seeks to solve is therefore to limit the friction levels observed in the systems of rotary seals with multiple channels.

Furthermore, the profusion of seals on various channels is an obstacle to dismantling the installation, and in particular to separating the rotor and the stator during maintenance operations.

DESCRIPTION OF THE INVENTION

The invention relates therefore to a fluid delivery device allowing a mechanical robot to be supplied with fluids from at least two sources of fluids.

In a known manner, such a device comprises a fixed portion, called a stator, comprising connections to the said sources of fluids, by means of flexible hoses in particular.

This device also comprises a rotating portion, also called a rotor, which moves with the robot and which also comprises a plurality of connections for the link with the robot. This assembly formed by the rotor and the stator comprises a plurality of channels which run through the rotor and the stator to allow the connections of the rotor and of the stator to be placed in communication during the rotary movement of the robot.

According to the invention, the rotor comprises two series of channels, that is:

a first series of channels running through the central portion of the rotor, the sealing at the passage between the rotor and the stator is provided by rotary seals in contact with the rotor and the stator;

a second series of channels running through a peripheral portion of the rotor; the continuity between the portions of the channels situated at the junction between the rotor and the stator is provided in a zone without contact, with a reduced mechanical clearance.

In other words, the invention consists in designing the fluid delivery device while distinguishing two categories of fluid supply channels. Some of these channels partially pass through the central portion of the rotor. For these channels, the interface between the rotor and the stator is furnished with seals, to ensure that the fluid pressure is maintained between the various channels.

Another series of channels passes through the outer portion of the rotor and therefore does not pass through the central portion of the rotor. The sealing at the zones of interface between the rotor and the stator is provided not by devices generating friction, but by zones without contact, whose clearance is calculated to restrict the leaks to acceptable levels taking account of the applications.

Thus, such a device is more particularly appropriate for causing fluids to flow, in the inner rotor, with a high pressure gradient, and typically motor fluids, to benefit from the sealing provided by rotary seals. Conversely, the fluids flowing in the channels of the peripheral portion of the rotor will preferably be fluids flowing at a high rate, and therefore at a more reduced level of pressure or negative pressure. It will be noted therefore that this level of controlled leakage at the outputs of the outer rotor provides virtual sealing without generating any mechanical friction. It is therefore possible to obtain relatively large angular accelerations compared with systems of the prior art in which all the fluid supplies require sealing by rotary seal.

Advantageously, in practice, the rotor may therefore consist of two assembled portions, that is a central portion and a peripheral portion, the main connections with the robot arm therefore being on this peripheral portion. Advantageously, these two portions of the rotor are assembled removably by mechanical means which therefore can be used to separate the peripheral portion of the rotor from the rest of the installation.

Thanks to this arrangement, the peripheral portion of the rotor may be separated from the installation, and notably from the inner portion of the rotor and of the stator, for maintenance and cleaning operations. It is thus possible to gain access to the ends of the portions of the channels running in the stator, since the latter emerge in the zone of the stator that is covered by the peripheral portion of the rotor, and that is therefore apparent when this peripheral portion of the rotor is extracted.

Advantageously, in practice, the peripheral portion of the rotor is mechanically integral with the robot tool, such that the dismantling of the installation, by separating the internal and peripheral portions of the rotor, does not make it necessary to disconnect the various flexible hoses linking the peripheral portion of the rotor and the robot tool.

BRIEF DESCRIPTION OF THE FIGURES

The manner of embodying the invention, and the advantages that flow therefrom, will clearly emerge from the description of the embodiment that follows, supported by the appended figures in which:

FIG. 1 is a view in longitudinal section of a delivery device according to the invention, coupled to a robot tool;

FIG. 2 is a detail view of the zone II of FIG. 1;

MANNER OF EMBODIMENT OF THE INVENTION

Figure 3:
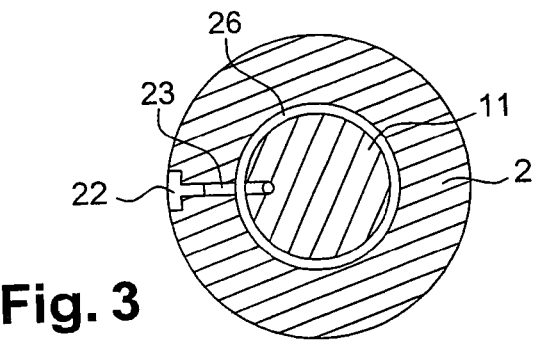
FIGS. 3, 4 and 5 are views in cross section along the planes III–III', IV–IV' and V–V' of FIG. 1.
Figure 4:
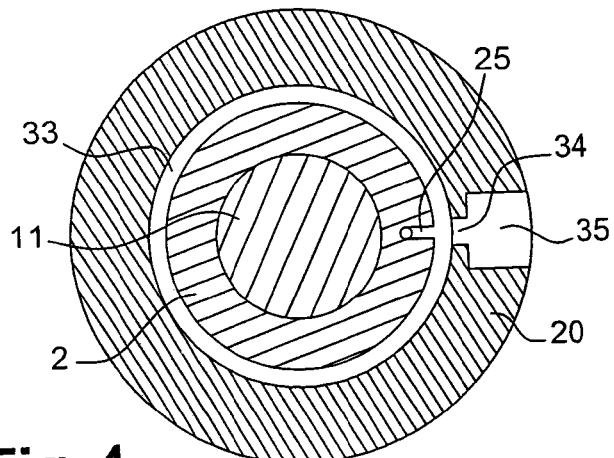

As illustrated in FIG. 1, the invention relates to a device for distribution of fluids intended to supply the various pneumatic or hydraulic components of a robot tool from various sources of fluids (not shown). More precisely, these various sources of fluids, which may be hydraulic or pneumatic, correspond to various outlets of electrovalves incorporated into a fixed assembly.

As illustrated in FIG. 1, the delivery device (1) comprises a stator (2) connected to a fixed mechanical reference (not shown) via a frame (3). The stator portion (2) conducting the fluids is attached to the frame (3) by means of a nut (4). Polarizing means (5) are provided in order to index the stator relative to the frame (3).

The stator (2) comprises in its central portion a recess (7) capable of accepting the central portion (11) of the rotor (10). In its top portion (12), the central portion (11) of the rotor is fitted with rolling bearings (13) allowing the rotor (10) to rotate relative to the fixed mechanical reference.

As already explained, this rotor (10) consists of two portions, that is the central portion (11) situated at the axis of rotation (15) of the assembly, and a peripheral portion (20) secured to the central portion (11), and extending laterally about the bottom portion of the stator (2). The peripheral portion (20) of the rotor is mechanically connected to the frame (50) of the tool (51), whose form illustrated in FIG. 1 comprises two articulated arms (52, 53) having no direct connection with the invention.

According to the invention, the stator (2) comprises a set of chambers (22, 24) forming connections capable of receiving the ends of the flexible hoses themselves connected to various sources of fluid. These chambers (22, 24) are extended by ducts (23, 25) drilled inside the stator (2) that are of two different types. Thus, the duct (23) emerges into the central portion of the stator, at the recess (26) receiving the rotor (11). This duct (23) emerges, as illustrated in FIG. 3, at an annular fillet (26) running round the circumference of the inner surface (7) of the stator. Different annular fillets (26, 26') are provided on this inner surface (7) of the stator, each corresponding to a duct linking with a chamber of the stator (22) capable of receiving the connection of a flexible hose. The various annular fillets (26, 26') provided on the inner surface of the stator are separated by seals (28) inserted into annular grooves (27). These seals (28) are typically O-ring seals which provide the sealing from one fillet (26, 26') to the other. These seals (28) are in contact with the annular groove (27) formed in the stator, and with the cylindrical surface (16) of the central portion (11) of the rotor.

Naturally, these O-rings may be replaced by a direct contact between zones of the outer surface of the rotor and zones opposite the inner face of the stator, with a choice of appropriate materials, for example in machinable ceramic, providing the sealing, but generating a certain resistive torque.

Opposite the annular fillet (26) of the stator, the rotor (11) has an internal duct (29) which emerges towards its cylindrical face (16) and which extends longitudinally downwards (30) to emerge again on the cylindrical face (16) of the inner rotor (11). This duct extends through the peripheral portion (20) of the rotor to emerge in a connection zone (32) suitable for receiving a flexible hose (not shown) connected via its other end to a pneumatic or hydraulic circuit mounted on the tool (51) of the robot.

In practice, the ducts (30) running through the inner rotor are more particularly intended to supply the cylinders causing the deformation of the arms (52) of the robot, and are therefore travelled by fluids at high pressure, typically of the order of a few bar for the hydraulic circuits.

According to another feature of the invention, the stator (2) comprises ducts (25) which do not emerge on its inner face, but on the contrary on its outer face (39), as illustrated in FIG. 1. These ducts (25) therefore bring a connection (24) intended to be linked to the sources of fluids into communication with a circumferential chamber (33). This chamber (33) of the stator comes opposite a conduit (34) of the outer rotor (20), itself emerging into a chamber for connection (35) with a flexible hose (not shown) connected to the tool. In this way, irrespective of the angular position of the rotor (10) relative to the stator (2), the connection chamber (35) of the rotor is automatically connected to the corresponding source of fluid.

As illustrated in FIG. 2, the sealing with respect to the chamber (33) is provided by a precise dimensioning of the outer surface (39) of the stator, relative to the inner surface (36) of the peripheral rotor (20). More precisely, the clearance (37) which extends over the whole circumference of the stator, has a calibrated value which, combined with its height (38), generates sufficient pressure drops to limit the leaks to a sufficient level for the desired application. Thus, the sealing between the various adjacent chambers (33, 33', 33") is provided by this characteristic clearance (37) and without mechanical contact.

According to another feature of the invention, and as illustrated in FIG. 2, the peripheral rotor may comprise a set of orifices (40) placing the characteristic clearance (37) in communication with the atmosphere. In this way, the various adjacent chambers (33, 33', 33") are pneumatically decoupled. This eliminates the risks of leaks from one adjacent chamber to the other. In other words, these orifices (40) are used to cancel out the negative pressures and overpressures resulting from the leaks generated in the characteristic clearance (37), in order to avoid disrupting the operation of the adjacent chambers.

Figure 5:
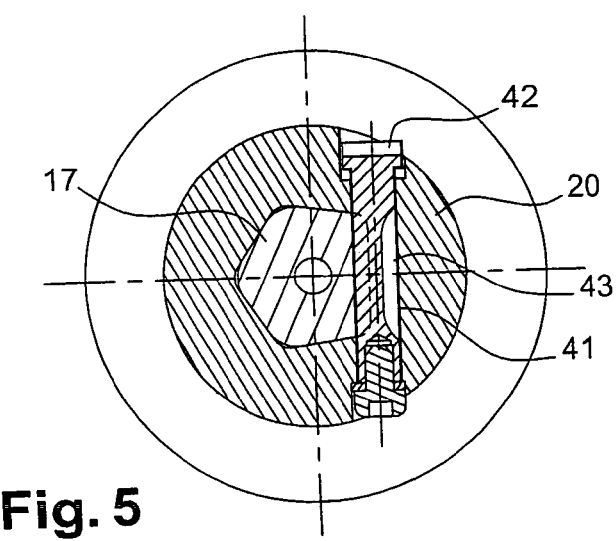

According to another feature of the invention, the peripheral rotor (20) is secured to the inner rotor (11) by disengageable means, as illustrated in FIG. 5. More precisely, the inner rotor (11) has a particular geometry in its bottom portion (17) making it possible to ensure polarization relative to the peripheral rotor (20). The peripheral rotor (20) comprises a through hole receiving a pivoting pin (42). This pivoting pin (42) passes through a matching-shaped housing made in the bottom portion (17) of the inner rotor. This pivoting pin (42) also has a recess (43) of appropriate dimensions to allow the inner rotor (17) to be disengaged after a certain rotation. Thus, in the form illustrated in FIG.

5, the peripheral rotor (20) is secured to the inner rotor (11). After a rotation of 180° of the pin (42), the recess (43) made in the pin (42) is opposite the inner rotor (17), thus allowing the peripheral rotor (20) free movement relative to the inner rotor. Thanks to this simple manipulation, it is thus possible to separate the peripheral rotor (20) and therefore the tool (50) from the rest of the installation. In this case, the outer face of the stator, and therefore all the chambers (33, 33', 33") are apparent and suitable for easy cleaning. This disposition is particularly advantageous for the ducts operating at negative pressure, and within which dust and other aspirated powdery materials accumulate, particularly for agrifoodstuff applications.

As a result of the foregoing, the invention has many advantages, and particularly:

it allows an easy dismantling of the fluid delivery device, thus facilitating the cleaning and maintenance operations;

the sealing is provided without over-increasing the resistive torque, which allows the robot to operate at a higher angular velocity at equivalent power.

What is claimed is:

1. Fluid delivery device, allowing a mechanical robot arm to be supplied with fluids from at least two sources of fluids, comprising:
    a fixed portion or stator, including connections to said sources of fluids;
    a rotating portion or rotor, capable of moving with the robot arm, and comprising a plurality of connections for a link with the said robot arm;
    a plurality of channels running through the rotor and the stator, to allow the connections of the stator and of the rotor to be placed in communication during rotary movement of the robot arm,
    wherein the rotor comprises two series of channels, that is:
        a first series of channels running through a central portion of the rotor, sealing at a passage between the rotor and the stator being provided by seals in contact with the rotor and the stator;
        a second series of channels running through the stator and emerging in a peripheral portion of the rotor, continuity between portions of the channels of said second series situated respectively on the rotor and the stator being provided in a zone without mechanical contact, by a reduced mechanical clearance.

2. Device according to claim 1, wherein the rotor comprises two assembled portions, that is the central portion and the peripheral portion, the peripheral portion comprising the connections for the link with the robot arm.

3. Device according to claim 2, wherein the two portions of the rotor are assembled removably by mechanical means.

4. Device according to claim 1, further comprising orifices for opening to atmosphere, emerging in zones of reduced mechanical clearance, between two adjacent channels of said second series.

5. Device according to claim 2, wherein ends of portions of channels situated in the stator emerge in a zone of the stator covered by the peripheral portion of the rotor.

* * * * *